Jan. 12, 1971          A. G. SERLE          3,553,785

APPARATUS FOR PREVENTING MOLDING DEFECTS

Filed June 30, 1967

INVENTOR
ALLAN G. SERLE

BY F. W. Guay

ATTORNEY

United States Patent Office 3,553,785
Patented Jan. 12, 1971

3,553,785
APPARATUS FOR PREVENTING MOLDING DEFECTS
Allan G. Serle, Clark, N.J., assignor to Celanese Corporation, New York, N.Y., a corporation of Delaware
Continuation-in-part of application Ser. No. 524,045, Feb. 1, 1966. This application June 30, 1967, Ser. No. 654,309
Int. Cl. B29f 1/04
U.S. Cl. 18—30　　　　　　　　　　　　　　　　4 Claims

ABSTRACT OF THE DISCLOSURE

This application discloses apparatus and methods for the injection molding of amorphous plastics and crystalline plastics. The disclosure relates particularly to methods and apparatus useful in reducing the occurance of jetting-type splay marks in the injection molding of crystalline plastics.

---

This is a continuation-in-part of United States application 524,045 filed Feb. 1, 1966, now abandoned.

SUMMARY OF THE INVENTION

It has been discovered that splay marks can be eliminated from the surface of articles molded out of crystalline plastics by utilizing a gate having an opening substantially larger than that of a pinpoint gate and by partially breaking up at least a portion of the stream of molten crystalline plastic by partially obstructing the flow of said stream after it passes through the aforementioned gate. The stream is obstructed by a retractable projection that is placed within the mold cavity.

Figure 1:
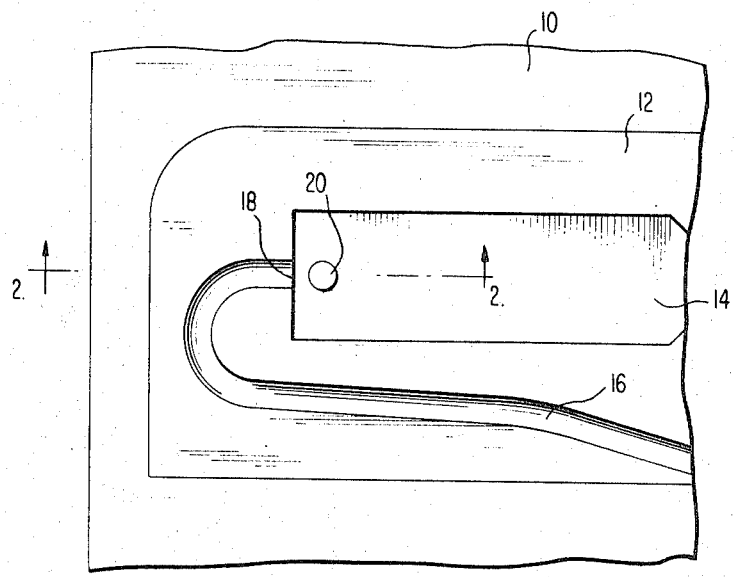
Figure 2A:
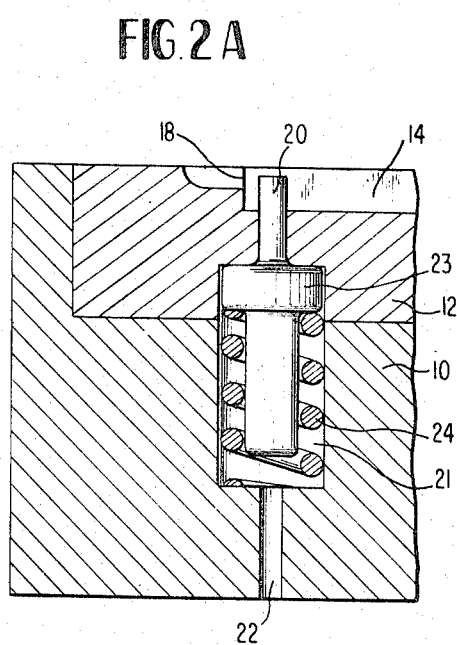
Figure 2B:
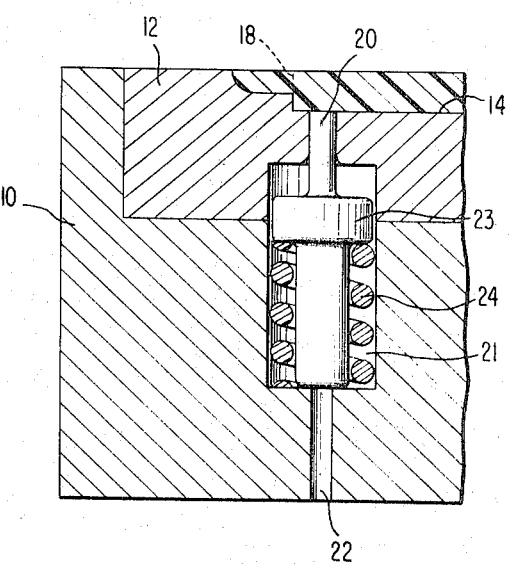

FIG. 1 is a top view of an injection molding apparatus of the present invention; and FIGS. 2a–2b are cross-sectional views of various molding steps of the present injection molding apparatus taken along section lines 2—2 as shown in FIG. 1.

DESCRIPTION OF PROBLEM ENCOUNTERED

During injection molding of plastic materials, a jet of molten plastic material is provided from a suitable heating chamber through a small gate into the mold cavity. As this jet of molten plastic material bursts suddenly from the small gate at a high velocity into the mold cavity, portions of the jet of plastic material are thrown out into the mold cavity in advance of the main wave front of plastic material provided by the gate. These portions cool and solidify before the mold cavity is completely filled and thus often cause scars or surface defects to be formed on the surface of the molding.

These surface defects are often called jetting-type splay marks and are usually restricted to the area of the mold cavity immediately adjacent the small gate. However, in some cases a portion of the plastic material which has prematurely solidified near the gate may be forced to move along the surface of the mold cavity due to the advancing wave front of molten material supplied by the gate. Thus, jetting-type splay marks may occur over substantial portions of a molding, and their occurrence is consequently very undesirable in injection molding.

Methods of minimizing or eliminating jetting-type splay marks have been previously developed and include controlling the rate of fill of the mold cavity and slowing the initial cooling of the molten plastic material within the mold cavity by external heating. Additionally, apparatus including spring-loaded auxiliary cores disposed in front of pinpoint injection gates has been heretofore developed for breaking up jets of molten amorphous-type plastic materials, such as cellulosics, in order to reduce surface defects on moldings.

Amorphous-type plastics, such as cellulosics, polystyrene, polymethyl methacrylate, polyvinyl chloride, etc. usually do not experience a sudden change in cooling rate when cooling from a molten state, and thus solidification of amorphous plastics occurs over a broad range of temperatures. Consequently, amorphous-type plastics have far less tendency to form jetting-type splay marks than do crystalline materials, such as oxymethylene polymers, polyethylene, polypropylene and polyamides, which form crystals and have an extremely rapid increase in cooling rate in passing from the molten to the solid state. It has thus been found that the use of spring-loaded auxiliary cores disposed in front of a pinpoint gate yields no improvement in preventing the occurrence of jetting-type splay marks in the injection molding of crystalline-type plastics. In fact, before the advent of the present invention, it has been thought that impingement of a jet of molten crystalline plastic through any gate opening upon a projection in a mold cavity would cause rapid cooling of portions of the molten jet and thus create more jetting-type splay marks than would have normally occurred.

Accordingly, a general object of the present invention is the provision of a method and apparatus for minimizing or substantially eliminating jetting-type splay marks on injection molded crystalline-type materials.

A more specific object of the present invention is the provision of a method and apparatus for preventing jetting-type splay marks on crystalline plastics and additionally preventing formation of internal and external defects in the molding resulting from lack of continuous pressure as the molding cools and contracts within a molding cavity.

Yet a further object of the present invention is the provision of a method and apparatus for preventing the formation of jetting-type splay marks in injection molded crystalline plastics wherein dimensional control of the final plastic molding may be easily practiced.

DETAILED DESCRIPTION OF INVENTION

In achieving these and other ojects that will be apparent hereafter, the present invention provides a method and an apparatus for preventing the formation of jetting-type splay defects on injection molded materials comprising crystalline plastics which comprises a retractable projection disposed in the molding ravity relatively near an injection gate having an opening substantially larger than a pinpoint gate. The jet of molten crystalline plastic formed by the gate impinges upon the projection disposed in the mold cavity in order to reduce splay marks on the final molding.

Referring now to FIG. 1, a mold supporting member 10 is provided with a cut-out portion which securely receives a mold member 12. Mold member 12 defines a mold cavity 14 for receiving molten plastic material from the runner 16 through an orifice or gate 18. A top portion, not shown, is provided to fit over mold cavity 14 to provide a top face to completely enclose the mold cavity. The molten plastic material may be supplied under pressure to the mold cavity 14 from a suitable heating chamber (not shown) through the runner 16 so that a jet of the molten plastic material is formed by the gate 18.

According to another embodiment (not shown) mold member 12 could also be made an integral part of supporting member 10.

As previously described, in conventional injection molding systems the sudden jetting of a molten crystalline-type plastic through a gate into a molding cavity causes portions or droplets of the molten plastic to be cooled and solidified in the mold cavity before the normally advancing wave front of plastic material completely fills the mold cavity. Consequently, the prematurely solidified portions of plastic material causes external scars or splay marks to form on the surface of the final plastic molding. The present invention reduces and substantially minimizes such external defects by the provision of a projection 20 slidably disposed in, say, the bottom portion of the mold cavity 14 and directly in front of the gate 18. As the molten crystalline plastic jets suddenly from gate 18, the molten jet impinges upon the surface of projection 20 and is broken up to prevent portions of the molten material from spurting out substantially in front of the normal advancement of the molten plastic material.

Gate 18, in order to be useful in preventing jetting-type splay marks in connection with projection 20, must have a sizable opening substantially greater than a pinpoint gate, as the pinpoint gate has not been found satisfactory for use with the projection 20 of the instant invention for preventing external splay marks with crystalline-type materials. A gate opening having a width approximately that of the width of projection 20 has been found to provide excellent results in connection with the present invention.

It is necessary that projection 20 be so disposed, relative to the stream of molten plastic entering from gate 18 into cavity 14, that at least a part of the stream impinges on the projection. Excellent results can be achieved even when only 5% or less of the cross-sectional area of the melt stream front is intercepted by or impinges on the projection 20.

An obvious requirement for the use of the projection in an existing mold is the ability to incorporate it without cutting through a waterline or interfering with some essential mold member. If a new mold is being planned the possible need for the device may be anticipated and it may be built into the cavity initially or provision may be made for its later inclusion. While the spring-loaded pin may be incorporated in various shapes, forms and locations to suit variations in part geometry and gating the following dimensional relationships and operating conditions are recommended for optimum results. The diameter of the projection protruding into the cavity should be equal to or greater than the depth of the cavity in the vicinity of the gate. The gate width, in an edge-gated part, should be about equal to the diameter of the pin. The distance from the gated edge of the cavity to the nearest side of the pin should not exceed the pin diameter or width. With the pin in its starting position (before material enters the cavity) the gap between the top base of the pin and the opposing cavity wall should be between ¼ and ½ the depth of the cavity. The pin may project from either side of the cavity. The axis of the pin should be parallel with the direction of opening and closing of the mold in order to prevent the pin from forming an undercut in the part. The spring pressure should be the minimum required to return the pin to its starting position after the molding has been removed from the cavity.

The distance between the gated edge and the projection will vary, for instance, depending upon the crystalline plastic material being treated. For example, when fillers or other additives are present in the base resin, it is sometimes desirable to increase or decrease the distance from the gated edge.

FIG. 2A is a cross-sectional view of a portion of the injection molding apparatus shown in FIG. 1, (again, only typical), wherein mold member 12 is shown fitted into support member 10. Projection 20 is disposed in a suitable chamber 21 defined by both support member 10 and mold member 12. If the mold were so constructed, as suggested above, that mold member 12 were an integral part of support member 10, chamber 21 could be defined by a deep counterbore in member 10, with a threaded plug forming the bottom of the chamber. Referring again to FIG. 2A, an air vent 22 is provided in the bottom of chamber 21 to prevent sticking or clogging of the projection 20. Projection 20 includes an upper end portion slidably extending through the bottom face of the mold cavity 14 and directly in front of the opening of gate 18. The upper end portion of projection 20 extends to a height somewhat less than the height of the sidewalls defining cavity 14 so that a space is left between the end of the upper portion and the top face of the mold cavity (not shown).

When the mold cavity is substantially filled, molten material fills this space. Optimum results are achieved when this space is of the magnitude in the range of about one-fourth to about one-half the depth of the cavity. However, smaller or larger spaces do provide improvements of the type contemplated herein. The back pressure developed from the incoming injected molten plastic material then forces the projection 20 downwardly from the mold cavity, as shown in FIG. 2B, in order to prevent the projection from forming a hole as the molding solidifies.

Projecton 20 includes an integrally-connected middle portion 23 having an increased diameter which abuts the top of the chamber 21 in order to limit the upward movement of the projection 20. A bottom end portion of projection 20 is integrally-connected to middle portion 23 and extends downwardly in order to reecive a coil spring 24 Spring 24 abuts the middle portion 23 and tensions the projection 20 upwardly. The tension provided by spring 24 may be a magnitude which allows projection 20 to be easily forced downwardly by back pressure developed in the mold cavity 14, or it may be of a magnitude sufficient to provide a constant pressure against the lower side of the semi-molten plastic material filling the mold cavity 14 in order to prevent voids and sinks from being formed on the molding as it cools and solidifies.

As suggested above, dimensional control of the final plastic mold is achieved when the tension of the coil spring 24 allows the upper end portion of projection 20 to extend slightly up into the cavity even when the mold cavity is filled with crystalline plastic material. A slight impression is thus left on the bottom of the solidified molding. The final dimensions of the solidfied moldings are directly dependent upon the uniformity and magnitude of pressure provided to the molten plastic in the molding cavity 14. Since the depth of any impression left by the projection 20 is a direct measurement of the pressure received by the molding, inspection of the depth of the impression will permit rapid, yet accurate, segregation of out-of-tolerance moldings.

According to a typical embodiment and referring to the drawings, a cavity 14 is established for a standard ASTM-type I tensile bar. The bar, however, is one-quarter inch in thickness. Projection 20 has a diameter of 0.25 inch and is disposed directly in front of gate 18, the distance between the gated edge of the mold cavity and the nearest surface of the projection being 0.062 inch. Gate 18 and runner 16 are both one-eighth inch radius half-round. The space between the upper end of the upper portion of projection 20 and the top face of mold cavity 14 is 0.090 inch. A ten-pound spring 24 is used.

An oxymethylene copolymer of the type defined above in U.S. Pat. 3,027,352 is fed to the cavity 14 in a conventional manner and a molded product results having superior qualities, particularly with respect to surface defects, e.g. splay marks, scars, etc.

Insofar as the optimum and preferred conditions, such as gate width, projection elevation and width, projection location relative to gate edge, projection and gate configuration, etc. are concerned, it must be remembered that the various conditions given above the merely illustrative. The present invention admits of substantial variations, the person skilled in the art will readily recognize, all of which variations are within the scope of the present invention.

The plastic material used for injection molding in the instant apparatus may be of any crystalline-type material capable of being injected into a mold while in a molten state. For example, moldings may be made in the instant apparatus from such highly crystalline plastics as acetal copolymers and homopolymers. Moldings of excellent quality have been produced with the instant method and apparatus from oxymethylene copolymers containing a major proportion of oxymethylene units and a minor proportion, preferably less than 15 mol percent, of units containing a —C—C bond or another structural unit less susceptible to thermal degradation than the oxymethylene units. Copolymers of the desired structure may be prepared by polymerizing trioxane together with a cyclic ether having adjacent carbon atoms, as disclosed in U.S. Pat. 3,027,352, Walling et al.

The instant spring-loaded projection may be moved, as suggested above, to any location adjacent to the area of gate 18 in order to suit variations in gate geometry and location. If desired, the projection 20 may also be utilized in other locations in the mold cavity in which other flow-induced surface defects might occur. The projection 20 may assume a variety of shapes or sizes as required by variation in the geometry of the gate or by the molding cavity geometry, and the pressure applied to the projection 20 by coil spring 24 may be made adjustable to suit variations in required molding pressures. In addition, it should be understood that projection 20 may protrude from either the top or bottom face of the mold cavity as desired.

According to a still further embodiment, a projection having a semi-circular cross-sectiion may be used with very desirable results, the flat face of the projection being flush against the gated edge of the cavity.

While this invention has been illustrated and described in a preferred embodiment, it is recognized that variations and changes within the skill of the art may be made therein without departing from the invention as set forth in the following claims.

The embodiments of the invention in which an exclusive property or privilege is claimed are defined as follows:

1. In an injection molding apparatus of the type wherein a retractable spring loaded projection means is disposed in the path of incoming molten crystalline plastic material, the axis of said projection means being parallel with the direction of opening and closing of a mold means, said molten crystalline plastic material contracting said projection means before entering a mold cavity means through a gate means, the improvement which comprises:

positioning said projection means in the mold cavity means in the path of said molten crystalline plastic material entering said mold cavity means through said gate means, wherein the distance from said gate means to the nearest side of said projection means does not exceed the width of said projection means; and providing said gate means with an opening substantially larger than that of a pinpoint gate.

2. The improvement of claim 1 wherein the width of the projection means protruding into said mold cavity means is at least equal to the depth of the mold cavity means in the vicinity of said gate means.

3. The improvement of claim 1 wherein the width of said gate means is substantially the same as the width of said projection means.

4. The improvement of claim 1 wherein the distance between the end of the projection means protruding into said mold cavity means and the opposite side of said mold cavity means is within the range from one-quarter to one-half the depth of said mold cavity means.

References Cited
UNITED STATES PATENTS

| | | | |
|---|---|---|---|
| 2,217,661 | 10/1940 | Anderson | 18—42 |
| 2,956,309 | 10/1960 | Herbst | 18—30X |
| 3,025,568 | 3/1962 | Hardy | 18—30 |

FOREIGN PATENTS

| | | |
|---|---|---|
| 1,028,046 | 2/1953 | France. |

J. SPENCER OVERHOLSER, Primary Examiner

M. O. SUTTON, Assistant Examiner

U.S. Cl. X.R.

18—42